US009001701B1

(12) United States Patent
Zhang et al.

(10) Patent No.: US 9,001,701 B1
(45) Date of Patent: Apr. 7, 2015

(54) PRIORITY ASSIGNMENT AND SIGNALING OF SCALABLE VIDEO IN A SWITCH BASED SYSTEM

(75) Inventors: Rui Zhang, Pleasanton, CA (US); Volvet Zhang, Hangzhou (CN); Xing Jin, Hangzhou (CN)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 13/487,364

(22) Filed: Jun. 4, 2012

Related U.S. Application Data

(60) Provisional application No. 61/555,125, filed on Nov. 3, 2011.

(51) Int. Cl.
  *H04L 12/16* (2006.01)
  *H04N 7/12* (2006.01)
  *H04L 25/38* (2006.01)
(52) U.S. Cl.
  CPC ...................................... *H04L 25/38* (2013.01)
(58) Field of Classification Search
  CPC ................................................ H04L 29/06414
  USPC ......................................................... 370/260
  See application file for complete search history.

(56) References Cited

U.S. PATENT DOCUMENTS

| 8,391,356 B1* | 3/2013 | Jafari et al. ............... 375/240.01 |
| 2005/0201629 A1* | 9/2005 | Karczewicz et al. ......... 382/240 |
| 2009/0295905 A1* | 12/2009 | Civanlar et al. ............ 348/14.09 |
| 2010/0111165 A1* | 5/2010 | Kim et al. ................ 375/240.08 |
| 2010/0228875 A1* | 9/2010 | Myers ........................... 709/231 |
| 2010/0296000 A1* | 11/2010 | Henocq et al. ................ 348/723 |
| 2011/0299448 A1 | 12/2011 | Meier et al. |

* cited by examiner

*Primary Examiner* — Shaq Taha
(74) *Attorney, Agent, or Firm* — Edell, Shapiro & Finnan, LLC

(57) ABSTRACT

Techniques for assignment and signaling of the priority information within the scalable video bitstream in a switch-based conferencing system are provided. The assignment of the priority across layers is made that achieves improved user experiences in common use cases, and a signaling scheme is provided that allows the server to efficiently forward the bitstream to each receiver according to its service request and downlink conditions. The impact of uplink bandwidth changes is considered intelligently so that the server can run with very low cost/high capacity, which is important to cloud-based services. Bit fields are defined in the Real-Time Protocol (RTP) extension headers to carry the priority information.

32 Claims, 9 Drawing Sheets

PRIORITY ASSIGNMENT AND SIGNALING OF SCALABLE VIDEO IN A SWITCH BASED SYSTEM

CROSS REFERENCE TO RELATED APPLICATION

This application claims priority to U.S. Provisional Application No. 61/555,125, filed Nov. 3, 2011, the entirety of which is incorporated herein by reference.

TECHNICAL FIELD

The present disclosure relates video conference systems.

BACKGROUND

A traditional architecture of a video conferencing system has a transcoder-based multi-point control unit (MCU) that communicates with a plurality of endpoints (also called clients). Each sending client sends out one stream to the MCU. The MCU receives the incoming streams from the clients, decodes them, re-composites the video, and encodes a new video stream for each receiving client. The cost of an MCU is relatively high and the end user (at an endpoint) can only receive what the MCU composes for the end user.

Recently, switch-based conferencing systems with scalable video coding have become the trend. In such a system, a client sends to a server a video bitstream with embedded scalability. The switch need only forward the bitstream or part of the bitstream to each receiving client according to the client's requested service level. The cost of the server is significantly reduced and the end user has the freedom to choose the video layout at his/her endpoint. However, the network conditions can fluctuate in both uplink direction (endpoint to server) and downlink direction (from the server to the endpoint). Unlike the transcoder-based solution where the MCU can adapt to the network conditions when transcoding, the server can only rely on the existing scalable bitstream for adaptation.

DESCRIPTION OF EXAMPLE EMBODIMENTS

Overview

From the perspective of an endpoint, at an endpoint device that is in network communication with a server in a switch-based multipoint video system, generates from a video signal to be sent to other endpoint devices, a scalable video coding (SVC) bitstream comprising a plurality of layers. Each layer is a spatial layer having a different resolution quality, and each spatial layer is capable of having one or more temporal layers with different temporal characteristics and each temporal layer is capable of having one or more quality layers with different signal to noise ratio characteristics. Priority is assigned to each of the plurality of spatial layers such that within a spatial layer, priority is assigned in order of temporal layer first and then quality layer. Priority information is inserted in extension headers of packets of the SVC stream for each of the plurality of layers of the SVC bitstream, the priority information representing relative level of quality of a respective layer of the SVC bitstream. The endpoint transmits the packets with the extension headers to the server.

Conversely, from the perspective of the server, the server receives from at least one sending client, an SVC bitstream comprising packets having headers that include priority information associated with each of a plurality of layers of the SVC bitstream, the priority information representing relative level of quality of a respective layer of the SVC bitstream. The server receives from at least one requesting client a request to receive video with a service level from the sending client. The server also receives from the requesting client messages indicating downlink network conditions from the server to the requesting client. The server parses the priority information in the headers of the packets in the bitstream received from the sending client and selecting packets for the layer of the SVC bitstream that satisfies the requested service level for the requesting client based on the downlink network conditions. The server forwards the selected packets of the SVC bitstream to the requesting client.

Example Embodiments

Figure 1:
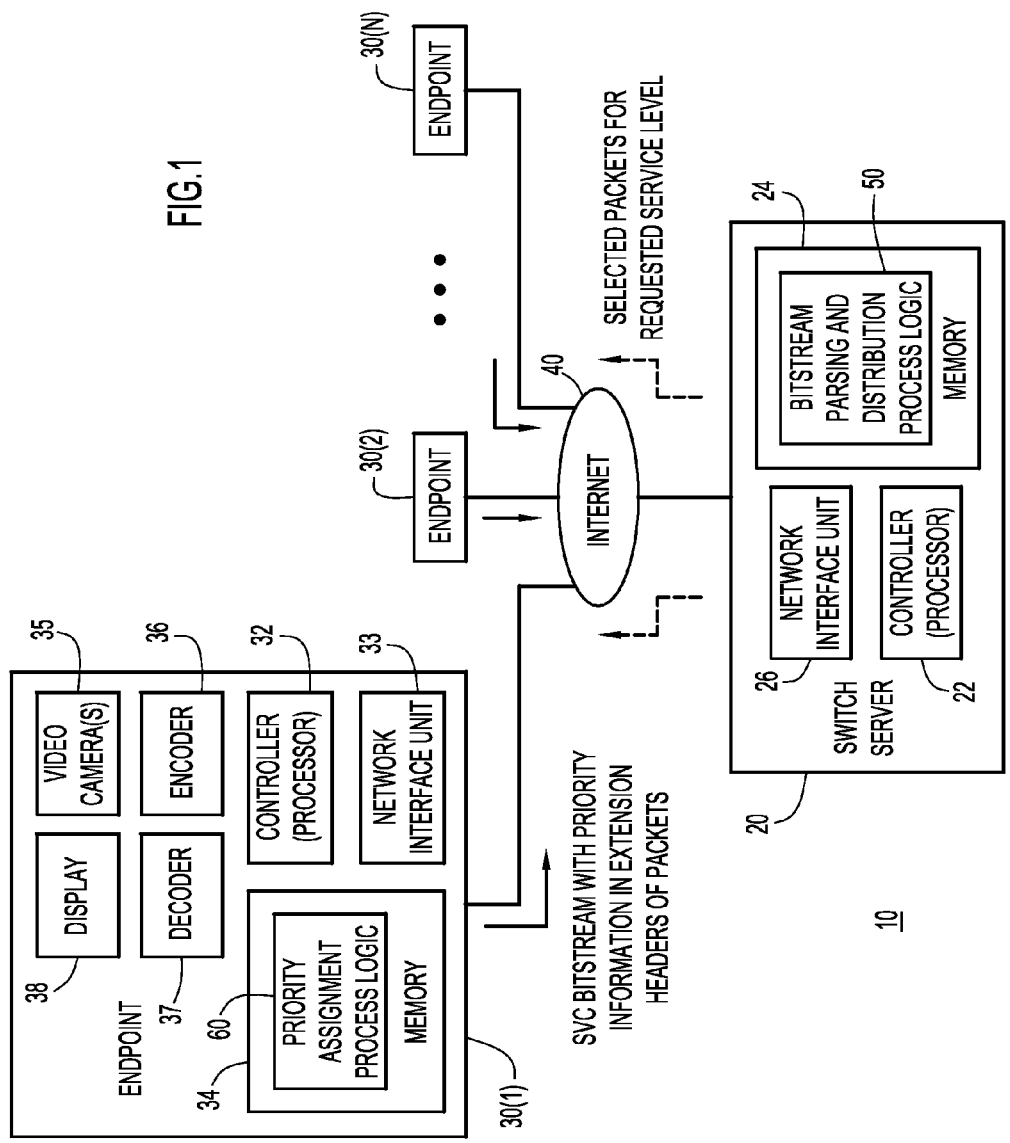
FIG. 1 is an example block diagram of a switched-based multipoint video conference system in which techniques are employed for priority based controlled forwarding of scalable video bitstreams.

Referring first to FIG. 1, a block diagram is shown of a switch-based video conference system 10 comprising a server 20 and a plurality of endpoints 30(1)-30(N) that communicate with the server 20 over the Internet shown at reference numeral 40. Each endpoint is also referred to herein as a "client" and more specifically an endpoint that sends video signals is referred to as a "sending client" and an endpoint that requests to receive video signals from another endpoint is referred to as a "requesting client" and a "receiving client".

The combination of scalable video coding and a switch-based conference architecture is new in the video conferencing industry. The H.264 Scalable Video Coding (SVC) standard defines a priority identifier (ID) field in its video header. However, it does not define how to assign the value in this field to different video layers. Furthermore, this video header is encapsulated in the payload portion of a Real Time Protocol (RTP) data packet. The payload is often encrypted which makes the parsing of such information on server processing time consuming and costly.

Techniques are provided herein for a low cost/high capacity server with minimum processing requirements, while still delivering gracefully downgraded/upgraded video experiences whenever there are network condition fluctuations. To this end, the server 20 comprises a controller (e.g., one or more processors) 22, a memory 24, and a network interface unit/device 26. The controller 22 comprises, for example, one or more microprocessors or microcontrollers that execute instructions stored in memory 24, to perform its various operations described herein. To this end, the memory 24 comprises instructions for bitstream parsing and distribution process logic 50. The network interface unit 33 enables network communications over the Internet 40 with the plurality of endpoints 30(1)-30(N), in both uplink directions (from the endpoints to the server 10) and in the downlink direction (from the server to the endpoints). There may be multiple instances of network interface cards in the network interface unit 33 to enable downlink and uplink communications with multiple endpoints simultaneously. The operations of the bitstream parsing and distribution process logic 50 are described hereinafter in conjunction with FIG. 9.

Each endpoint 30(1)-30(N) has similar components, and for simplicity the endpoint components are shown in FIG. 1 only for endpoint 30(1). The components of an endpoint include a controller (e.g., one or more processors) 32, a network interface unit/device 33, memory 34, one or more video cameras 35, an encoder 36, a decoder 37 and a display 38. The controller 32 performs the overall control functions of the endpoint 32 and may execute software programs stored in memory 34. There are instructions in memory 34 for priority assignment process logic 60, whose operations are described hereafter in conjunction with FIG. 8. The network interface unit 33 enables network communications over the Internet 40 with the server 20 in both uplink and downlink directions. The video camera(s) 35 view a scene at an endpoint location and generate a video signal that is supplied to the encoder 36. The encoder 36 encodes the video signal according to an encoding algorithm (e.g., SVC encoding algorithm) and supplies the encoded video signal to the controller 32 for further processing, e.g., priority assignment information generation and insertion as described further hereinafter. The decoder 37 decodes a received video signal (received from the server 20) and supplies the decoded video signal to the display 38.

The memory 24 in the server 20 and the memory 34 in the endpoints 30(1)-30(N) may comprise read only memory (ROM), random access memory (RAM), magnetic disk storage media devices, optical storage media devices, flash memory devices, electrical, optical, or other physical/tangible memory storage devices. Thus, in general, the memory 24 and 34 may comprise one or more tangible (non-transitory) computer readable storage media (e.g., a memory device) encoded with software comprising computer executable instructions and when the software is executed (by a processor) it is operable to perform the operations described herein.

Techniques are provided for priority assignment and signaling of scalable video in a switch based system. As shown in FIG. 1, each endpoint generates an SVC bitstream and inserts priority information in extension headers of packets of the SVC bitstream. The priority is assigned at the sending client when the embedded scalable video bitstream is generated. Bit fields in RTP extension headers of packets are defined for the priority information. The use of extension headers allows for minimum processing at the server 20, so that the server can easily serve multiple clients at different service levels. There are technical challenges at the sending client side as to how to mark the importance of each video packet within the scalable bitstream to help the server decide which packets to forward to a requesting client so that the user experience is as best as possible for the requested service level and current network conditions.

The priority is defined in a way such that for all the receiving clients in the system 10 that might request different service levels, they will have a naturally better user experience when the network bandwidth conditions are greater, and get gracefully degraded user experience when network (bandwidth) conditions deteriorates. The conditions on both uplink and downlink may be taken into account. The server 20 parses the extension headers of the packets in the received SVC bitstream from a sending client, selects packets from that bitstream for a requested service level from a requesting client, and sends those packets to the requesting client. The server 20 may handle processing of multiple uplink SVC bitstreams sent to the server from multiple endpoints and downlink forwarding to multiple requesting clients.

In scalable video coding, one embedded bitstream is generated that has a plurality of layers of information. Each layer of the bitstream can be used to reproduce video frames with different perceptual qualities. There is a base layer and one or more enhancement layers. Often there are dependencies among the layers, with the enhancement layer being dependent on the base layer, or a higher layer being dependent on the lower layer. There are usually three dimensions to provide the scalability: spatial (different video resolution), temporal (different bit rate, frame rate, etc.), and quality (different quantization in compression results to different image quality, i.e., signal-to-noise ratio).

For example, one example of a generic H.264 SVC bitstream has two spatial layers, with the higher spatial layer dependent on the lower spatial layer. For example, an s0 layer has a spatial resolution/size of 640×360, and the s1 layer has spatial resolution/size of 1280×720. Each spatial layer has two temporal layers, for example, with a higher temporal layer being dependent on the lower temporal layer. For example t0 is 15 fps (frame per second) and t1 is 30 fps. Furthermore, each temporal layer has two quality layers, again with a higher layer being dependent on the lower layer. For example, q0 has a quality of approximately 30 dB in peak signal to noise ratio (PSNR) while q1 has a quality of approximately 35 dB in PSNR. All together, this example embedded bitstream can provide 8 levels of quality as a combination of "stq". For example, a bitstream extracted at s0t0q0 is the base layer to provide video of 640×360 at 15 fps with around 30 dB quality, and another bitstream extracted at s1t1q1 provide video of 1280×720 at 30 fps with approximately 35 dB quality.

The above example is a very generic case. Each system may have its own static or dynamic layering structure. Another layering structure is one in which there is no dependency among spatial layers. Moreover, quality scalability may or may not be used in the temporal layer.

Figure 2:
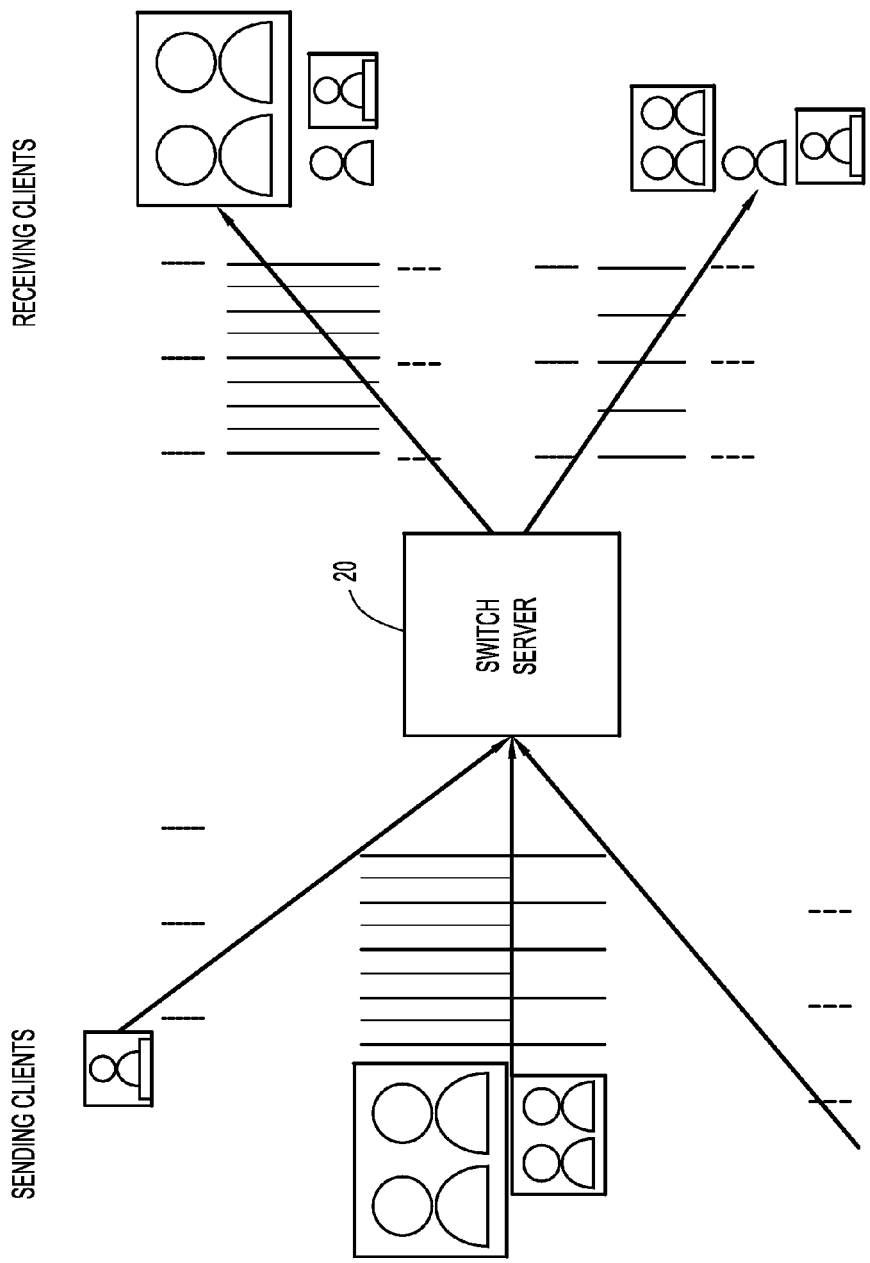
FIG. 2 is a flow diagram depicting a receiving client centric controlled handling of scalable video bitstreams.
Figure 3:
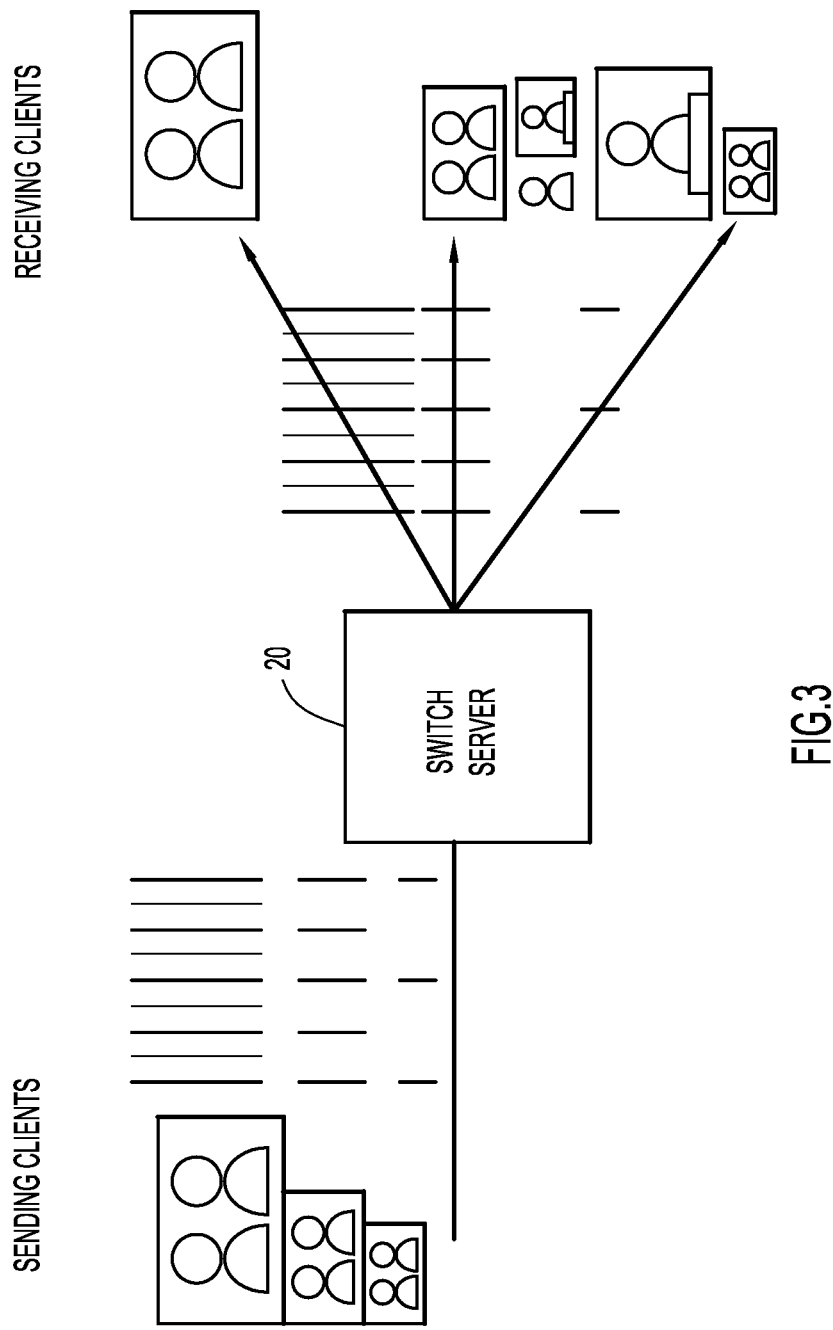
FIG. 3 is a flow diagram depicting a sending client centric controlled handling of scalable video bitstreams.

FIGS. 2 and 3 illustrate example scenarios in a switch-based multipoint video system, as shown in FIG. 1. FIG. 2 illustrates a receiving client centric scenario in which each receiving client can see multiple senders at the same time with different layouts or video quality in terms of resolution/frame rate/picture quality. The receiving clients decide what to view. The sending clients can have more bitstreams if other receiving clients so request.

A receiving client requests a particular video layout to each sending client it is viewing. The layout links directly to the resolution it receives. For example, in FIG. 2, the client in the upper right is receiving a 640×360 video from a sending client in the center left and several 160×90 videos from other sending clients. The technical challenge is that the downlink network conditions may not be good enough for some period of time to let the 640×360 layer bit stream through on the link. The server 20 thus needs a mechanism to instead forward the lower resolution bitstream to this link. An even bigger challenge is that the uplink network conditions may not be good enough for some period of time to let the 640×360 layer bit stream through on the uplink. The server 20 thus needs to forward the highest resolution layer the sending client is providing to the receiving client. Furthermore, within the same spatial resolution range, the conditions on the downlink may fluctuate. The embedded priority information the sending client inserts in the packet will help the server to "throw away" or discard data intelligently.

If the server needs to determine all of the details of resolution, frame rate etc., involved, using conventional techniques, it would have to parse the video headers within the RTP payload, which is often encrypted. This leads to higher processing requirements and reduced capacity on the server. Consequently, as explained above, RTP extension headers are instead used by the sending clients to signal the priority information to the server 20. The RTP extension headers are not within the RTP payload, and thus are more quickly parsed and evaluated than if inside the payload (and possibly encrypted). This helps the server 20 to quickly switch among service layouts and easily upgrade/downgrade with very low processing burden.

Figure 4:
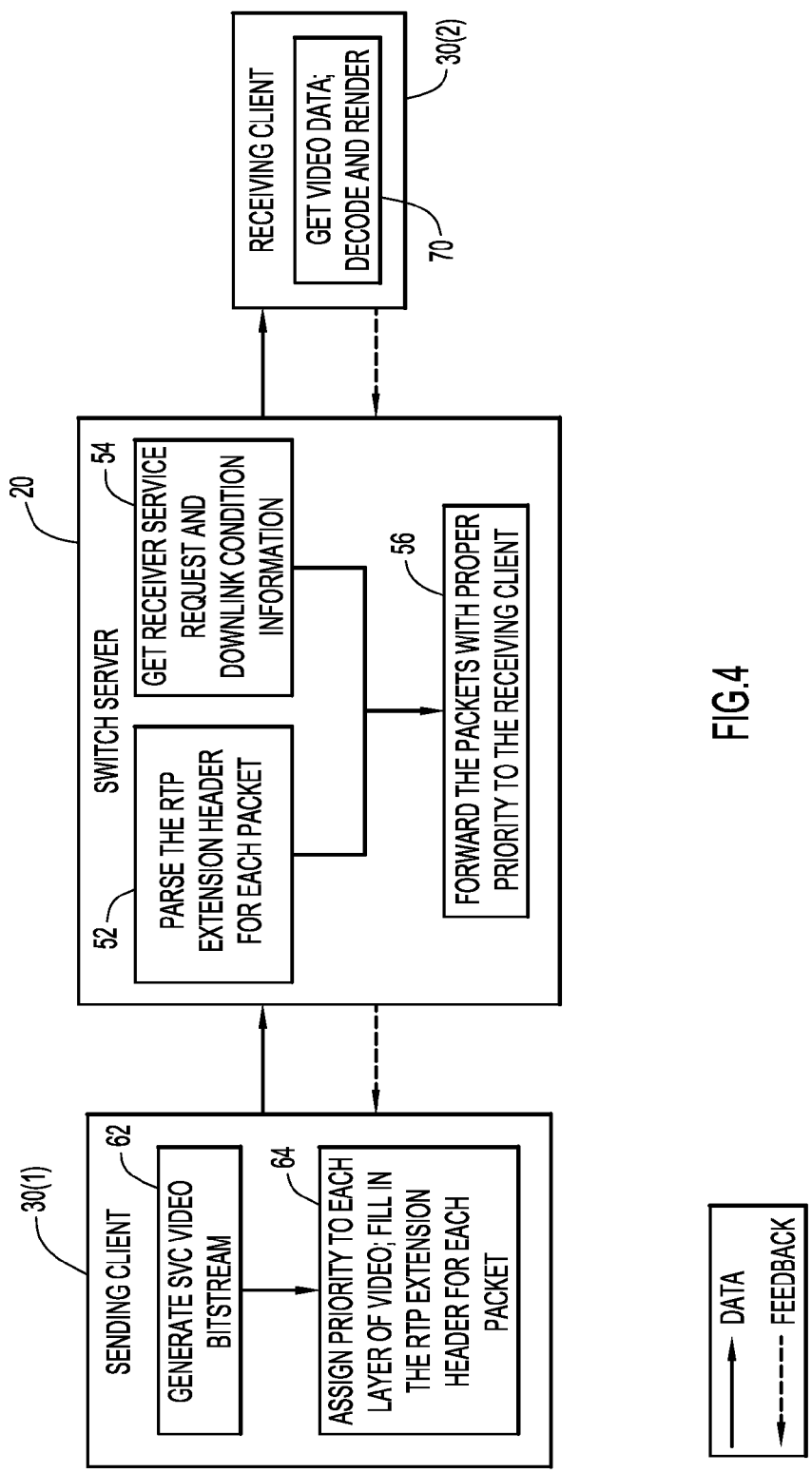
FIG. 4 is a flow diagram generally depicting operations performed at the sending client and server for priority based controlled distribution of a scalable video bitstream.

Reference is now made to FIG. 4 which illustrates the operations performed in a sending client, the server 20 and a receiving client in accordance with the techniques described herein. In this example, the sending client is shown at reference numeral 30(1) and the receiving client is shown at reference numeral 30(2). The operations performed by the server 20 (by execution of the bitstream parsing and distribution logic) are shown at reference numerals 52, 54 and 56. The operations performed by the sending client 30(1) (by execution of the priority assignment process logic 60) are shown at operations 62 and 64. The operation performed by receiving client 30(2) is shown at reference numeral 70.

Specifically, beginning with the operations performed at the sending client 30(1), at 62, an SVC bitstream is generated from a video signal received from a video camera. At 64, the sending client 30(1) assigns priority to each individual layer of the SVC bitstream and inserts the priority information into an RTP extension header of packets for each layer of the SVC bitstream.

The server 20 receives the SVC bitstream from the sending client 30(1), and at 52, parses only the RTP extension headers of packets to determine the priority of packets for each layer of the SVC bitstream. Also, at 54, the server 20 receives a service level request from the receiving/requesting client 30(2), the service level request acting as a request to receive video with a desired or specified service level from the sending client 30(1). In addition, at 54, the server receives from the receiving/requesting client 30(2) messages indicating downlink network conditions from the server 20 to the requesting client 30(2). In parsing the RTP extension headers of the packets, the server 20 selects packets for the layer of the received SVC bitstream that satisfies the requested service level of the requesting client 30(2) based on the downlink network conditions, assuming the downlink network conditions are sufficient. At 56, the server 20 forwards the selected packets of the SVC bitstream to the requesting client 30(2).

FIG. 4 also shows that there are feedback messages from the receiving client 30(2) to the server 20 over the downlink bandwidth conditions, and there are feedback messages from the server 20 to the sending client 30(1) to monitor the uplink conditions. The server may discard packets of an SVC bitstream that are not supportive of the service level of the receiving/requesting client. When the network conditions worsen on the downlink, the server 20 will first drop the lower priority packets among the selected packets for the layer of the SVC bitstream that satisfies the requested service level. If the downlink network conditions deteriorate even further, the server will switch to another layer of the bitstream for the receiving client. That is, the server will select packets for another layer of the SVC bitstream that is suitable for the current downlink network conditions. Conversely, when the server 20 receives messages from the requesting client indicating that downlink network conditions have improved, the server will select packets for another layer of the SVC bitstream that is suitable for the improved downlink network conditions. Similar processing happens on the sender side.

Figure 5:
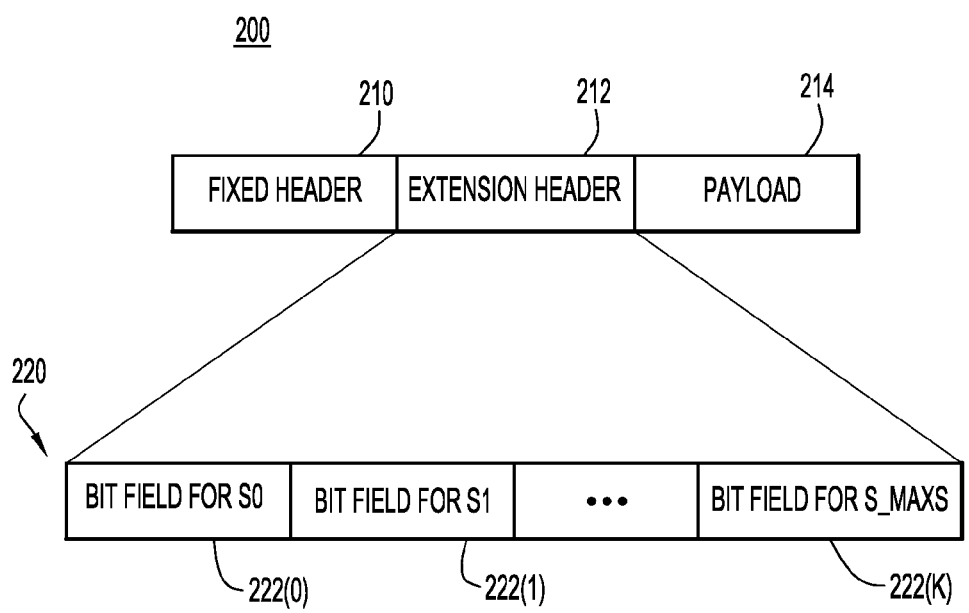
FIG. 5 is a diagram of a packet that carries video and illustrating an extension header that is used to carry priority information for layers of a scalable video bitstream.
Figure 6:
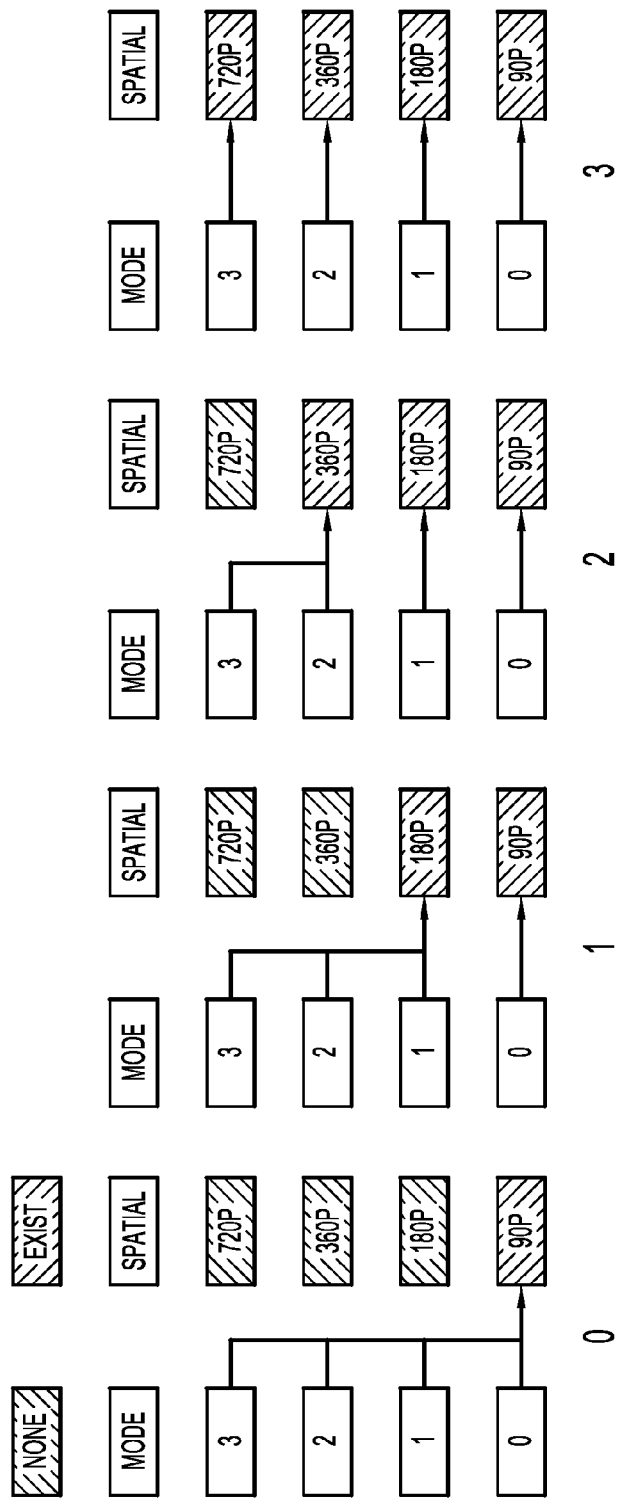
FIG. 6 is a diagram illustrating an example of the assignment of priority information for multiple layers of a scalable video bitstream.

Referring to FIG. 5, a diagram is shown of an RTP packet 200 having a header extension in which the priority information is inserted/appended according to the techniques described herein. The diagram shown in FIG. 6 is simplified in that it does not show many fields that are part of a standard RTP packet. However, as it pertains to the techniques described herein, the packet 200 comprises a fixed header 210, an extension header 212 and a payload 214. A sending client generates and inserts priority information in the extension header 212 of the RTP packet 200 for each layer of the SVC bitstream. Note that the extension header 212 is outside of the payload 214. In many applications, the payload 214 is encrypted, but the extension header 212 is not. This enables the server 20 to parse and evaluated the bits of the extension header 212 much faster, even when the payload content is encrypted.

FIG. 5 shows one example at reference numeral 220 of the format of the priority information. The priority assignment among layers (and within layers) of an SVC bitstream follows a mathematical formula. There are two types of bit fields defined. For a first type, the bitstreams for each layer are independent of each other. For the second type, the bitstreams for each layer have dependency.

The end user service level is associated directly with the spatial resolution in the display layout. It is common in system design that the spatial layers are encoded independently. The priority level is first defined within the respective spatial layers. The dependency or relative priorities of the spatial layers are represented separately. When there is no dependency, the spatial layers can be treated separately. This principle is reflected in the priority information format as well.

As explained above, each of the plurality of layers of the SVC bitstream is a spatial layer having a different resolution quality. For each spatial layer, a priority level is assigned according to its temporal layer identifier (ID) (indicative of a relative it rate/frame rate) and quality layer ID (indicative of a relatively PSNR). Each spatial layer is capable of having one or more temporal layers with different temporal characteristics, and each temporal layer is capable of having one or more quality layers with different PSNR characteristics. The priority is defined in the order of temporal layer first, and then quality layer. The range of the priority, and therefore the number of bits to use, is decided/determined by the maximum number of temporal layers and quality layers. In other words, priority information is assigned to each of the plurality of spatial layers such that within a spatial layer, priority is assigned in order of temporal layer first and then quality layer.

The following summarizes an example of priority assignment.

Define max_T as the maximum number of temporal layers, and define max_Q as the maximum number of quality layers. Then, ceiling(log_base_2(max_T*max_Q+1) bits are used to represent the priority level within each spatial layer. In practice, 4 bits may be sufficient.

For each layer with temporal layer ID t and quality layer ID q, its priority ID is calculated as t*Max_Q+q. The smaller priority ID represents a "higher" priority.

A value for INVALID is defined, indicating that the current packet is not used for the service level represented in this bit field. INVALID is defined as all bits equal to 1. Other valid values are defined with the remaining representations.

For systems that may have skipped (unused) layers, it is assumed the full layers possible are there to calculate the ID. In other words, there can be non-continuous priority IDs assigned. In this case, the server reads and interprets only the relative importance. In other words, the layers may be generated at the sending client such that there is one or more layers missing from the plurality of layers sent by the sending client. The server construes this based on relatively importance of the layers, even if a layer is missing.

For example, as shown in FIG. 5, the priority information comprises a bit field for each spatial layer carried in the SVC bitstream, where bit field 222(0) is the bit field for spatial layer S0, bit field 222(1) is the bit field for spatial layer S1, and so on, and bit field 222(K) is the bit field for spatial layer (S_MaxS), where S_MaxS−1 is the maximum number of spatial layers. Each bit field has a bit pattern that represents a priority and comprises a plurality of bits equal in number to ceiling(log_base_2(max_T*max_Q+1), where max_T represents the maximum number of temporal layers and max_Q represents the maximum number of quality layers, and such that within a spatial layer, a priority identifier for temporal layer t and quality layer q is computed as t*Max_Q+q, where a smaller priority identifier value represents a higher priority.

FIG. 5 illustrates a format of the RTP extension header when the spatial layers are independently decoded, where Max_S fields of priority ID are defined, with each field using ceiling(log_base_2(max_T*max_Q)) bits. Again, one practical example is 4 fields with 4 bits in each field.

The use of these fields is such that the server can have a simple low cost design. For each data packet in spatial layer s, temporal layer t and quality layer q, the priority ID in the bit fields of the spatial layers that are lower in priority than s are assigned as INVALID (an invalid priority identifier or indicator), and the priority ID in all the bit fields corresponding to the spatial layers equal or greater in priority than s are assigned as t*max_Q+q. The advantage of the priority ID being associated with not only the current spatial layer field but also those that are associated with a higher spatial layer is to allow the server to forward the bitstream to the client by parsing a reduced amount of information, enabling the server to make more decisions in a given period of time.

By inserting the priority information in the RTP extension header, the server need not decode (and decrypt) payload fields (which is a processing burden) and can therefore quickly switch among service layouts and easily upgrade/downgrade service to a client with very low processing burden. The server does not need to know the underlying resolutions/frame rate/quality it forwards to a client. The server only needs to know the service layout the client is requesting for a particular sender, and it will read through the priority IDs to forward the packets of SVC bitstream from the appropriate SVC layer to the client in order to support the service level requested by the client. The server can also throw away lower priority packets to adapt to network conditions, or even switch to a SVC layer for a lower service level when network conditions worsen.

FIG. 6 illustrates an example scenario that employs the priority information coding scheme described herein. In this example, there are a total of four resolution layers: 90p (160×90), 180p (320×180), 360p (640×360) and 720p (1280×720). The sending client can send out four possible SVC bitstreams, depending on the sending client capability and/or the uplink network conditions: 90p only, 90p and 180p, 90p and 180p and 360p, 90p and 180p and 360p and 720p. The columns in FIG. 6 illustrate the four resolution layers cases and the corresponding priority ID bit field assignment. Each bit field corresponds to one mode.

Suppose, for example, that in a multipoint conference session, there are three receiving clients viewing the video from this sending client: one client is requesting service 0 (90p), the second client is requesting service 1 (180p), and the third client is requesting service 2 (360p). Data in column "2" is sent out from the sending client to the server. For the downlink to the client requesting service 0 (90p), the server knows that the client is requesting service 0, so the server only needs to look into packets that have the service 0 bit field with priority IDs not equal to INVALID and forwards those packets to that client. Similarly, for the second client and third client the server only needs to look into packets that have the service 1/service 2 bit fields, respectively, with priority IDs not equal to INVALID and forwards those packets to the second and third clients, respectively. When the sending client sends all three resolutions (90p/180p/360p) on the uplink to the server, the 90p/180p/360p streams are forwarded to the three clients, respectively. If the network conditions of the uplink has issues (and cannot support the bandwidth for these service levels), the sender may send only 90p/180p, as shown in column "1" in FIG. 6. Since packets for 180p in this case still have the bit field for service 2 with the same priority ID value as for service 1, the server will forward this stream to the second client. The server does not need to know anything about the changes in the uplink network conditions. On the other hand, for the downlink side, if the downlink network conditions for the second client, for example, worsen, the server starts to drop the packets with a lower priority ID in bit field for service 2 to the second client. If the bandwidth is still not good enough for the highest priority ID in the bit field for service 2 to the second client, the server will start to forward those packets that have valid priority ID in bit field of service 1 to the second client. Thus, the server can efficiently adapt to the network condition of both uplink and downlink.

Figure 7:
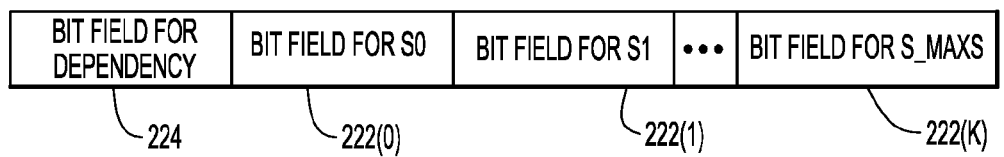
FIG. 7 is a diagram illustrating format of priority information that includes layer dependency information.

FIG. 7 illustrates a format for an RTP extension header when the spatial layers are dependently decoded. In addition to the bit fields 222(0)-222(K) for the respective spatial layers (as shown in FIG. 5), there is another bit field 224 to represent the dependency among the spatial layers. The length of the bit field 224 is sum(1, 2, . . . Max_S−1). In one example of bit field 224, bit 0 is used to indicate the spatial layer 1 relies on the spatial layer 0, bits 1 and 2 are used to indicate if the spatial layer 2 relies on the spatial layer 0 and spatial layer 1 respectively. For a maximum of 4 spatial layers, 6 bits are needed for this field. The sending client fills out the bits of field 224 based on the SVC bitstream layering structure being used.

Figure 8:
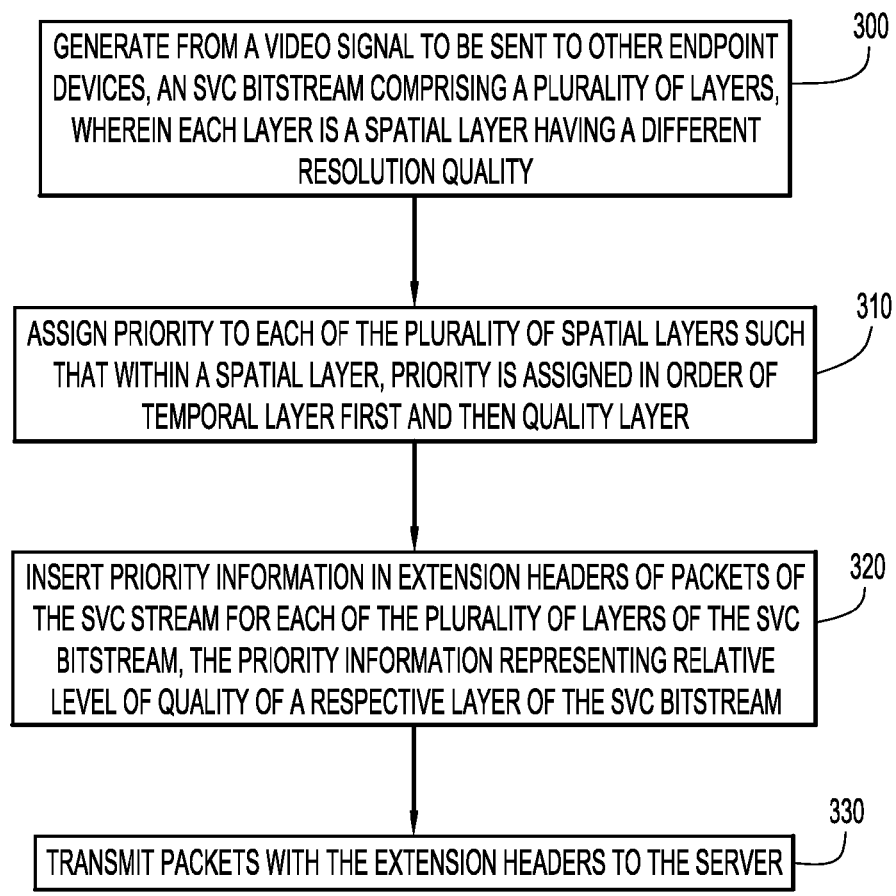
FIG. 8 is an example of a flow chart depicting operations performed in an endpoint when sending a scalable video bitstream to the server.

Reference is now made to FIG. 8, which illustrates a flow chart summarizing the operations performed at a sending client (when executing the priority assignment process logic 60 shown in FIG. 1). At 300, the sending client generates from a video signal to be sent to other endpoint devices, an SVC bitstream comprising a plurality of layers, wherein each layer is a spatial layer having a different resolution quality. Furthermore, each spatial layer is capable of having one or more temporal layers with different temporal characteristics and each temporal layer is capable of having one or more quality layers with different signal to noise ratio characteristics. At 310, the sending client assigns priority to each of the plurality of spatial layers such that within a spatial layer, priority is assigned in order of temporal layer first and then quality layer. At 320, the sending client inserts priority information in extension headers of packets of the SVC stream for each of the plurality of layers of the SVC bitstream, the priority information representing relative level of quality of a respective layer of the SVC bitstream. As explained above, the priority information may be inserted into extension headers that are not part of payload portions of the packets, e.g., extension headers of RTP packets. Finally, at 330, the sending client transmits packets with the extension headers to the server. Furthermore, the sending client may monitor uplink network conditions to the server, and adjust the quality level of one or more of the plurality of layers or number of layers used for an SVC bitstream based on the uplink network conditions.

Figure 9:
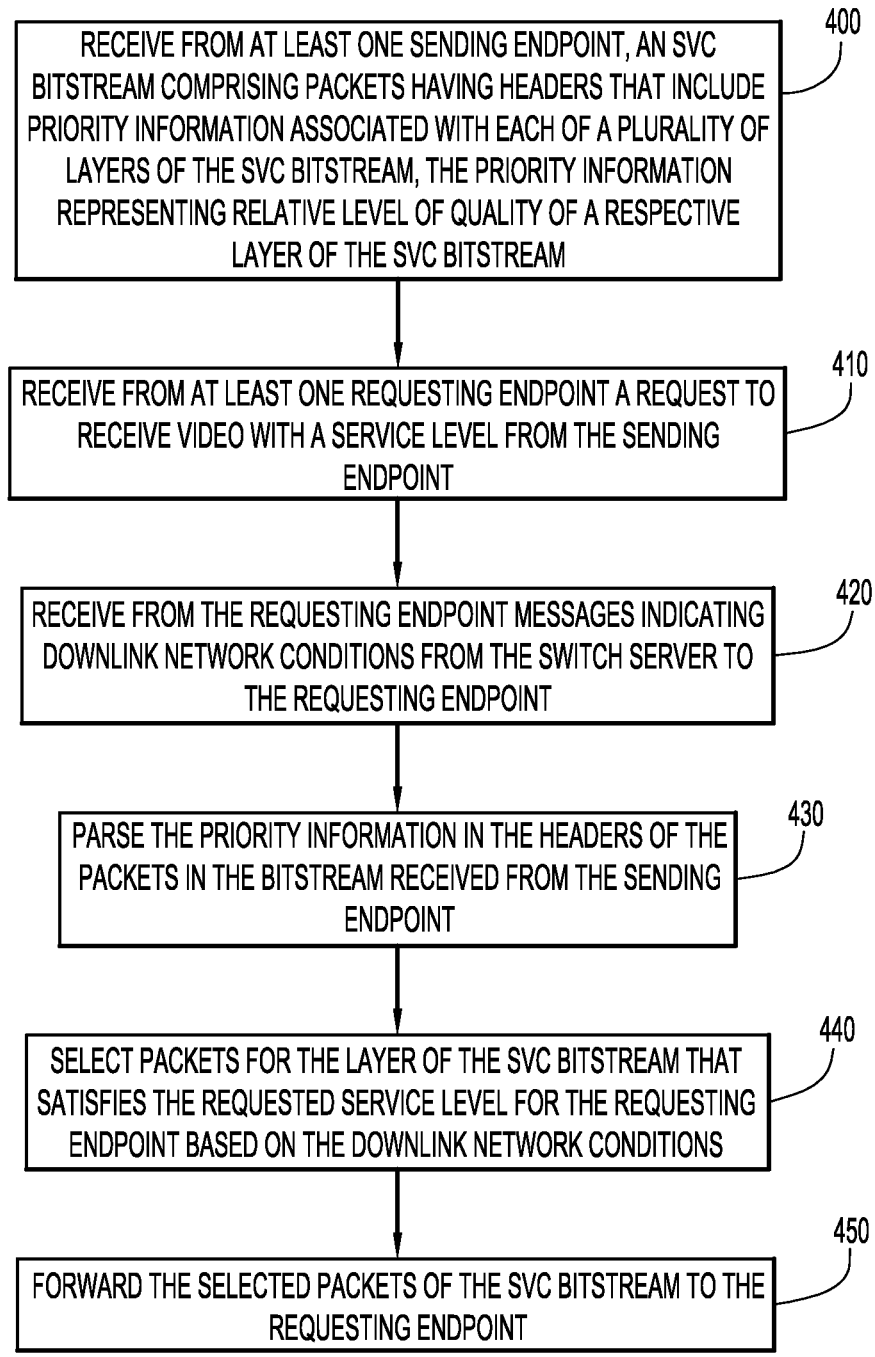
FIG. 9 is an example of a flow chart depicting operations performed in a server when receiving a scalable video bitstream for forwarding to a requesting endpoint.

FIG. 9 illustrates a flow chart that depicts and summarizes the operations performed at the server, upon executing the bitstream parsing and distribution process logic 50 referred to above in connection with FIG. 1. At 400, the server receives from at least one sending endpoint (client), an SVC bitstream comprising packets having headers that include priority information associated with each of the plurality of layers of the SVC bitstream, the priority information representing relative level of quality of a respective layer of the SVC bitstream. At 410, the server receives from at least one requesting endpoint a request to receive video with a specified service level from the sending endpoint. At 420, the server receives from the requesting endpoint messages indicating downlink network conditions from the server to the requesting endpoint. At 430, the server parses the priority information in the headers of the packets in the bitstream received from the sending endpoint. At 440, the server selects packets for the layer of the SVC bitstream that satisfies the requested service level for the requesting endpoint based on the downlink network conditions. At 450, the server forwards the selected packets of the SVC bitstream to the requesting endpoint.

The server takes into consideration dependency of the spatial layers. When the server needs to forward a bit stream to a receiving endpoint that requests service level s, it looks into the dependency bit field (224 in FIG. 7) to determine which other spatial layers s it depends on, for example a set of {s'}. It then forwards the packets with valid priority ID in the bit fields corresponding to {s'} to this endpoint. When the packets need to be dropped because of the downlink network conditions, the packets of lower spatial layer will have higher priority to forward than those of higher spatial layer.

The advantages of the techniques described herein are as follows. The priority among the SVC bitstreams are assigned in a very concise and clear way, so that the end user experience can be gracefully downgraded and upgraded when there are network fluctuations on either uplink to the server or downlink to the receiving client. The priority information is signaled in an RTP extension header and organized intelligently so that the server can forward the bitstream to each requesting client very efficiently to meet the requesting client's request as well as to adapt to the network conditions.

The techniques described herein may be implemented in one or more application specific integrated circuits (ASICs) in digital logic gates, or by a processor that executes instructions stored in a processor readable memory storage media, e.g., ROM, RAM or other non-transitory memory storage device, as part of equipment that performs encoding of screen content video (e.g., in a video endpoint and/or video conference switch or bridge) for transmission over a network.

The above description is intended by way of example only.

What is claimed is:

1. A method comprising:
   at a server that is in network communication with a plurality of endpoints in a switch-based multipoint video system, receiving from at least one sending endpoint, a scalable video coding (SVC) bitstream comprising packets having headers that include priority information assigned based on a mathematical ceiling function applied to a maximum number of temporal layers and a maximum number of quality layers of a plurality of layers of the SVC bitstream, the priority information representing relative level of quality of a respective layer of the SVC bitstream;
   receiving from at least one requesting endpoint a request to receive video with a service level from the sending endpoint;
   receiving from the requesting endpoint messages indicating downlink network conditions from the server to the requesting endpoint;
   parsing the priority information in the headers of the packets in the bitstream received from the sending endpoint;
   selecting packets for the layer of the SVC bitstream that satisfies the service level for the requesting endpoint based on the downlink network conditions;
   forwarding the selected packets of the SVC bitstream to the requesting endpoint; and
   discarding packets of the SVC bitstream that are not supportive of the service level of the requesting endpoint.

2. The method of claim 1, wherein parsing comprises parsing extension headers that are not part of payload portions of the packets.

3. The method of claim 2, wherein parsing comprises parsing Real-Time Protocol (RTP) extension headers.

4. The method of claim 1, upon receiving messages from the requesting endpoint indicating deteriorating downlink network conditions, further comprising discarding packets having lower priority among the selected packets for the layer of the SVC bitstream that is determined to satisfy the service level.

5. The method of claim 4, upon receiving messages from the requesting endpoint indicating further deteriorating downlink network conditions, selecting comprises selecting packets for another layer of the SVC bitstream that is suitable for the downlink network conditions.

6. The method of claim 5, upon receiving messages from the requesting endpoint indicating improved downlink network conditions, selecting comprises selecting packets for another layer of the SVC bitstream that is suitable for the improved downlink network conditions.

7. The method of claim 1, wherein each of the plurality of layers is a spatial layer having a different resolution quality, and each spatial layer is capable of having one or more temporal layers with different temporal characteristics and each temporal layer is capable of having one or more quality layers with different signal to noise ratio characteristics.

8. The method of claim 7, further comprising, at the sending endpoint, assigning priority information to each of the plurality of spatial layers such that within a spatial layer, priority is assigned in order of temporal layer first and then quality layer.

9. The method of claim 8, wherein assigning comprises generating a bit pattern representing a priority and comprising a plurality of bits equal in number to ceiling(log_base_2(max T*max Q+1), where max_T represents the maximum number of temporal layers and max Q represents the maximum number of quality spatial layers, and such that within a spatial layer, a priority identifier for temporal layer t and quality layer q is computed as t'Max Q+q, where a smaller priority identifier value represents a higher priority.

10. The method of claim 9, wherein assigning comprises, for each packet in spatial layer s, temporal layer t and quality layer q, the priority identifier in bit fields for the spatial layers that are lower in quality than s are assigned as an invalid priority identifier, and the priority identifier in all the bit fields corresponding to the spatial layers equal or greater than the quality of s are assigned a priority identifier based on the computation t'max Q+q.

11. The method of claim 9, wherein assigning comprises generating a bit field indicating dependency for a spatial layer on another spatial layer.

12. A method comprising:
at an endpoint device that is in network communication with a server in a switch-based multipoint video system, generating from a video signal to be sent to other endpoint devices, a scalable video coding (SVC) bitstream comprising a plurality of layers, wherein each layer is a spatial layer having a different resolution quality, and each spatial layer is capable of having one or more temporal layers with different temporal characteristics and each temporal layer is capable of having one or more quality layers with different signal to noise ratio characteristics;
assigning priority to each of the plurality of spatial layers based on a mathematical ceiling function applied to a maximum number of temporal layers and a maximum number of quality layers of the plurality of layers of the SVC bitstream, such that within a spatial layer, priority is assigned in order of temporal layer first and then quality layer;
inserting priority information in extension headers of packets of the SVC stream for each of the plurality of layers of the SVC bitstream, the priority information representing relative level of quality of a respective layer of the SVC bitstream;
transmitting packets to the server; and
discarding packets of the SVC bitstream that are not supportive of the service level of the requesting endpoint.

13. The method of claim 12, wherein inserting comprises inserting the priority information into extension headers that are not part of payload portions of the packets.

14. The method of claim 13, wherein inserting comprises inserting the priority information into extension headers of Real-Time Protocol (RTP) packets.

15. The method of claim 12, further comprising monitoring uplink network conditions to the server, and adjusting the quality level of one of the plurality of layers or number of layers based on the uplink network conditions.

16. The method of claim 12, further comprising generating the plurality of layers such that there is one or more layers missing from the plurality of layers.

17. The method of claim 12, wherein assigning comprises generating a bit pattern representing a priority and comprising a plurality of bits equal in number to ceiling(log_base_2(max T'max Q+l), where max_T represents the maximum number of temporal layers and max Q represents the maximum number of quality spatial layers, and such that within a spatial layer, a priority identifier for temporal layer t and quality layer q is computed as t'Max Q+q, where a smaller priority identifier value represents a higher priority.

18. The method of claim 17, wherein assigning comprises, for each packet in spatial layer s, temporal layer t and quality layer q, the priority identifier in bit fields for the spatial layers that are lower in quality than s are assigned as an invalid priority identifier, and the priority identifier in all the bit fields corresponding to the spatial layers equal or greater than the quality of s are assigned a priority identifier based on the computation t'max Q+q.

19. The method of claim 17, wherein assigning comprises generating a bit field indicating dependency for a spatial layer on another spatial layer.

20. An apparatus comprising:
a network interface device configured to enable communications over a network with a plurality of endpoints in a switch-based multipoint video system;
a memory;
a processor coupled to the memory and the network interface device, wherein the processor is configured to:
receive from at least one sending endpoint, a scalable video coding (SVC) bitstream comprising packets having headers that include priority information assigned based on a mathematical ceiling function applied to a maximum number of temporal layers and a maximum number of quality layers of a plurality of layers of the SVC bitstream, the priority information representing relative level of quality of a respective layer of the SVC bitstream;
receive from at least one requesting endpoint a request to receive video with a service level from the sending endpoint;
receive from the requesting endpoint messages indicating downlink network conditions from the server to the requesting endpoint;
parse the priority information in the headers of the packets in the bitstream received from the sending endpoint;
select packets for the layer of the SVC bitstream that satisfies the service level for the requesting endpoint based on the downlink network conditions;
forward the selected packets of the SVC bitstream to the requesting endpoint; and
discarding packets of the SVC bitstream that are not supportive of the service level of the requesting endpoint.

21. The apparatus of claim 20, wherein the processor is configured to, upon receiving messages from the requesting endpoint indicating deteriorating downlink network conditions, discard packets having lower priority among the selected packets for the layer of the SVC bitstream that is determined to satisfy the service level.

22. The apparatus of claim 21, wherein the processor is configured to, upon receiving messages from the requesting endpoint indicating further deteriorating downlink network conditions, select packets for another layer of the SVC bitstream that is suitable for the downlink network conditions.

23. An apparatus comprising:
a network interface device configured to enable communications over a network between an endpoint and a server in a switch-based multipoint video system;
a memory;
a processor coupled to the memory and the network interface device, wherein the processor is configured to:
generate from a video signal to be sent to other endpoints in the switched-based multipoint video system, a scalable video coding (SVC) bitstream comprising a plurality of layers, wherein each layer is a spatial layer having a different resolution quality, and each spatial layer is capable of having one or more temporal layers with different temporal characteristics and each temporal layer is capable of having one or more quality layers with different signal to noise ratio characteristics;
assign priority to each of the plurality of spatial layers based on a mathematical ceiling function applied to a maximum number of temporal layers and a maximum number of quality layers of the plurality of layers of the SVC bitstream such that within a spatial layer, priority is assigned in order of temporal layer first and then quality layer;

insert priority information in extension headers of packets of the SVC stream for each of the plurality of layers of the SVC bitstream, the priority information representing relative level of quality of a respective layer of the SVC bitstream;

transmit packets to the server; and discarding packets of the SVC bitstream that are not supportive of the service level of the requesting endpoint.

24. The apparatus of claim 23, wherein the processor is configured to insert the priority information into extension headers of Real-Time Protocol (RTP) packets.

25. The apparatus of claim 23, wherein the processor is configured to assign by generating a bit pattern representing a priority and comprising a plurality of bits equal in number to ceiling(log_base_2(max_T*max_Q+1), where max_T represents the maximum number of temporal layers and max_Q represents the maximum number of quality spatial layers, and such that within a spatial layer, a priority identifier for temporal layer t and quality layer q is computed as t*Max_Q+q, where a smaller priority identifier value represents a higher priority.

26. The apparatus of claim 25, wherein the processor is configured to assign, for each packet in spatial layer s, temporal layer t and quality layer q, the priority identifier in bit fields for the spatial layers that are lower in quality than s are assigned as an invalid priority identifier, and the priority identifier in all the bit fields corresponding to the spatial layers equal or greater than the quality of s are assigned a priority identifier based on the computation t'max Q+q.

27. One or more non-transitory computer readable storage media encoded with software comprising computer executable instructions and when the software is executed operable to:

at a server that is in network communication with a plurality of endpoints in a switch-based multipoint video system, receive from at least one sending endpoint, a scalable video coding (SVC) bitstream comprising packets having headers that include priority information assigned based on a mathematical ceiling function applied to a maximum number of temporal layers and a maximum number of quality layers of a plurality of layers of the SVC bitstream, the priority information representing relative level of quality of a respective layer of the SVC bitstream;

receive from at least one requesting endpoint a request to receive video with a service level from the sending endpoint;

receive from the requesting endpoint messages indicating downlink network conditions from the server to the requesting endpoint;

parse the priority information in the headers of the packets in the bitstream received from the sending endpoint;

select packets for the layer of the SVC bitstream that satisfies the service level for the requesting endpoint based on the downlink network conditions;

forward the selected packets of the SVC bitstream to the requesting endpoint; and discarding packets of the SVC bitstream that are not supportive of the service level of the requesting endpoint.

28. The non-transitory computer readable storage media of claim 27, further comprising instructions operable to, upon receiving messages from the requesting endpoint indicating deteriorating downlink network conditions, discard packets having lower priority among the selected packets for the layer of the SVC bitstream that is determined to satisfy the service level.

29. The non-transitory computer readable storage media of claim 28, further comprising instructions operable to, upon receiving messages from the requesting endpoint indicating further deteriorating downlink network conditions, select packets for another layer of the SVC bitstream that is suitable for the downlink network conditions.

30. One or more non-transitory computer readable storage media encoded with software comprising computer executable instructions and when the software is executed operable to:

at an endpoint device that is in network communication with a server in a switch-based multipoint video system, generate from a video signal to be sent to other endpoint devices, a scalable video coding (SVC) bitstream comprising a plurality of layers, wherein each layer is a spatial layer having a different resolution quality, and each spatial layer is capable of having one or more temporal layers with different temporal characteristics and each temporal layer is capable of having one or more quality layers with different signal to noise ratio characteristics;

assign priority to each of the plurality of spatial layers based on a mathematical ceiling function applied to a maximum number of temporal layers and a maximum number of quality layers of the plurality of layers of the SVC bitstream such that within a spatial layer, priority is assigned in order of temporal layer first and then quality layer;

insert priority information in extension headers of packets of the SVC stream for each of the plurality of layers of the SVC bitstream, the priority information representing relative level of quality of a respective layer of the SVC bitstream;

transmit packets to the server; and discarding packets of the SVC bitstream that are not supportive of the service level of the requesting endpoint.

31. The non-transitory computer readable storage media of claim 30, wherein the instructions operable to insert comprise instructions operable to insert the priority information into extension headers of Real-Time Protocol (RTP) packets.

32. The non-transitory computer readable storage media of claim 30, wherein the instructions operable to assign comprise instructions operable to generate a bit pattern representing a priority and comprising a plurality of bits equal in number to ceiling(log_base_2(max T'max Q+1), where max_T represents the maximum number of temporal layers and max Q represents the maximum number of quality spatial layers, and such that within a spatial layer, a priority identifier for temporal layer t and quality layer q is computed as t'Max Q+q, where a smaller priority identifier value represents a higher priority.

* * * * *

UNITED STATES PATENT AND TRADEMARK OFFICE
CERTIFICATE OF CORRECTION

PATENT NO. : 9,001,701 B1  
APPLICATION NO. : 13/487364  
DATED : April 7, 2015  
INVENTOR(S) : Zhang et al.

Page 1 of 1

It is certified that error appears in the above-identified patent and that said Letters Patent is hereby corrected as shown below:

In The Claims

In Column 10, Line 66, delete "spatial" after "quality"

In Column 13, Line 21, delete "spatial" after "quality"

In Column 14, Line 56, delete "spatial" after "quality"

Signed and Sealed this
Twenty-second Day of March, 2016

Michelle K. Lee
*Director of the United States Patent and Trademark Office*